United States Patent
Bi

(10) Patent No.: US 9,842,419 B2
(45) Date of Patent: Dec. 12, 2017

(54) METHOD AND DEVICE FOR DISPLAYING PICTURE, AND STORAGE MEDIUM THEREFORE

(71) Applicant: HISENSE MOBILE COMMUNICATIONS TECHNOLOGY CO., LTD., Qingdao (CN)

(72) Inventor: Te Bi, Qingdao (CN)

(73) Assignees: HISENSE MOBILE COMMUNICATIONS TECHNOLOGY CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 71 days.

(21) Appl. No.: 14/707,490

(22) Filed: May 8, 2015

(65) Prior Publication Data

US 2016/0063756 A1 Mar. 3, 2016

(30) Foreign Application Priority Data

Sep. 3, 2014 (CN) .......................... 2014 1 0445367

(51) Int. Cl.
  *G06T 11/60* (2006.01)
  *G06T 19/00* (2011.01)
(52) U.S. Cl.
  CPC .............. *G06T 11/60* (2013.01); *G06T 19/00* (2013.01)

(58) Field of Classification Search
  None
  See application file for complete search history.

(56) References Cited

U.S. PATENT DOCUMENTS

| 9,046,685 B2 * | 6/2015 | Nakada ................ G02B 27/017 |
| 2008/0295037 A1 * | 11/2008 | Cao ........................ G06F 3/0482 |
| | | 715/852 |

FOREIGN PATENT DOCUMENTS

| CN | 1893675 A | 1/2007 |
| CN | 102802007 A | 11/2012 |
| WO | WO-2006073131 A1 | 7/2006 |

* cited by examiner

*Primary Examiner* — Said Broome
(74) *Attorney, Agent, or Firm* — Harness, Dickey & Pierce, P.L.C.

(57) ABSTRACT

The disclosure discloses a method and device for display a picture, relates to the field of electronic information and is intended to address the problems of a long modeling period of time and inefficient modeling when the picture is three-dimensionally displayed. Particularly the method includes: obtaining at least one picture sequence number, wherein a picture sequence number corresponds to a picture; substituting the at least one picture sequence number into a preset set of equations to calculate location information of at least one picture, wherein the preset set of equations is a set of equations created in a virtual three-dimensional coordinate system, and location information of a picture corresponds to a picture sequence number; and displaying the at least one picture according to the location information of the at least one picture. The disclosure is applicable to display of a picture.

18 Claims, 4 Drawing Sheets

METHOD AND DEVICE FOR DISPLAYING PICTURE, AND STORAGE MEDIUM THEREFORE

CROSS-REFERENCE TO RELATED APPLICATION

This application claims the benefit and priority of Chinese Patent Application No. 201410445367.4 filed Sep. 3, 2014. The entire disclosure of the above application is incorporated herein by reference.

FIELD

The present disclosure relates to the technical field of electronic information and particularly to a method, a device and a storage medium for displaying a picture.

BACKGROUND

This section provides background information related to the present disclosure which is not necessarily prior art.

More and more electronic devices are emerging along with the development of electronic information technologies, and there are higher and higher personalized demands of users for software on the electronic devices used by the users, so it becomes crucial to improve experiences of the users by satisfying the personalized demands of the users using the software on the electronic devices.

A picture library is one of the common softwares frequently used by the users on the various electronic devices. In the prior art, when the user browses pictures using the picture library software, the pictures are listed sequentially or they are tiled on a screen of the electronic device.

SUMMARY

This section provides a general summary of the disclosure, and is not a comprehensive disclosure of its full scope or all of its features.

In an aspect, an embodiment of the present disclosure provides a method for display a picture, so as to present the picture on a display device with a display screen, the method including:

obtaining at least one picture sequence number, wherein a picture sequence number among the at least one picture sequence number corresponds to a picture;

substituting the at least one picture sequence number into a preset set of equations to calculate location information of at least one picture, herein the preset set of equations is a set of equations created in a virtual three-dimensional coordinate system, and location information of a picture among the at least one picture corresponds to a picture sequence number; and displaying the at least one picture according to the location information of the at least one picture.

In another aspect, an embodiment of the present disclosure provides an electronic device including one or more processors, and a memory with program codes stored therein, which is capable to be executed by the one or more processors to implement:

an obtaining component, configured to retrieve at least one picture sequence number, herein a picture sequence number among the at least one picture sequence number corresponds to a picture;

a modeling component, configured to substitute the at least one picture sequence number obtained by the obtaining component into a preset set of equations, to calculate location information of at least one picture, herein the preset set of equations is a set of equations created in a virtual three-dimensional coordinate system, and location information of a picture among the at least one picture corresponds to a picture sequence number; and a displaying component, configured to display the at least one picture, according to the location information of the at least one picture obtained by the modeling component.

In still another aspect, an embodiment of the present disclosure further provides a computer readable storage medium including one or more sets of instructs, to display a picture on a display device with a display screen, and the one or more sets of instructs are capable of being executed by a processor to implement the following:

obtaining at least one picture sequence number, herein a picture sequence number among the at least one picture sequence number corresponds to a picture;

substituting the at least one picture sequence number into a preset set of equations, to calculate location information of at least one picture, herein the preset set of equations is a set of equations created in a virtual three-dimensional coordinate system, and location information of a picture among the at least one picture corresponds to a picture sequence number; and displaying the at least one picture, according to the location information of the at least one picture.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
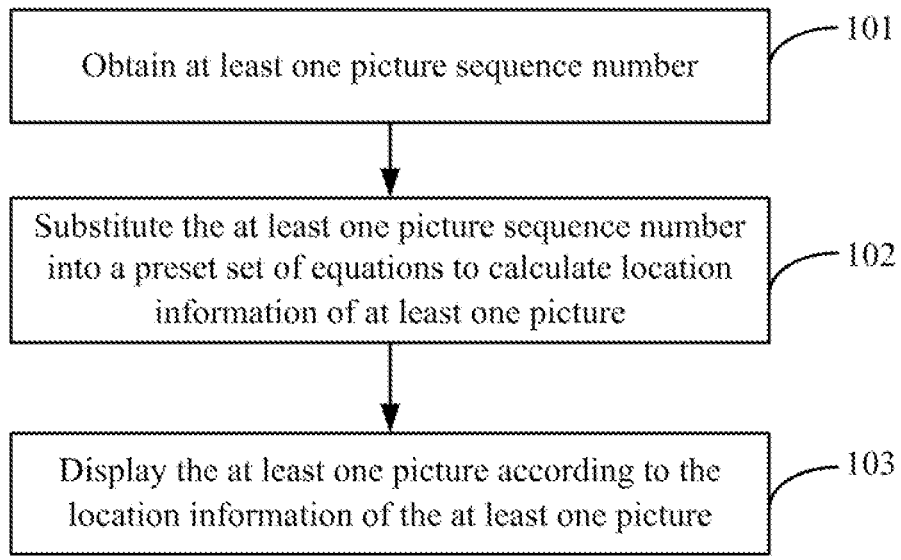
FIG. 1 illustrates a flow chart of a method for displaying a picture according to an embodiment of the present disclosure.

An embodiment of the present disclosure provides a method for displaying a picture, and optionally this method for displaying a picture is applicable to an electronic device, and as illustrated in FIG. 1, the method includes the following operations:

S101 is to obtain at least one picture sequence number.

Among the at least one picture sequence number, a picture sequence number corresponds to a picture, and herein the picture corresponding to the at least one picture sequence number may be a picture to be displayed, by the electronic device, on a screen of the electronic device at some instance of time. In an embodiment of the present disclosure, the sequence number of the picture to be displayed may be prearranged by the electronic device, or the electronic device may alternatively rank and number the pictures, according to the picture names or the picture types, but the present disclosure will not be limited to any particular scheme in which the pictures to be displayed are numbered.

S102 is to substitute the at least one picture sequence number into a preset set of equations to calculate location information of at least one picture.

In the operation S102, the preset set of equations is a set of equations created in a virtual three-dimensional coordinate system, herein location information of a picture corresponds to a picture sequence number. In an embodiment of the present disclosure, a three-dimensional mathematical model indicated by the set of equations may be a helical model, or may be a temporal model, and herein the present disclosure will not be limited to any particular form of the three-dimensional mathematical model.

In an embodiment of the present disclosure, the virtual three-dimensional coordinate system including the x axis, the y axis and the z axis is pre-created, herein the x axis extends in the width direction of the screen of the electronic device, the y axis extends in the length direction of the screen of the electronic device, and the z axis extends in the direction perpendicular to the screen of the electronic device.

Further, optionally the preset set of equations relates to relationships between the picture sequence number and the coordinate values of the picture respectively on the x axis, the y axis and the z axis in the virtual three-dimensional coordinate system, herein a picture is provided with corresponding location information, and location information of a picture includes the coordinate of the picture on the x axis, the coordinate thereof on the y axis, and the coordinate thereof on the z axis, in the pre-created virtual three-dimensional coordinate system. Optionally, the location information of the picture may include the transverse location of the picture and the height of the picture in a three-dimensional display effect, and the distance between a plane where the picture lies and a plane where the screen of the electronic device lies in the three-dimensional display effect.

S103 is to display the at least one picture, according to the location information of the at least one picture.

Optionally, location information of a picture may be coordinate values of a central point of the picture in the virtual three-dimensional coordinate system, or location information of a picture may be coordinate values of another point of the picture, but the present disclosure will not be limited thereto. In an embodiment of the present disclosure, the electronic device may display the pictures with a uniform size in a form of thumbnail.

In an embodiment of the present disclosure, after the at least one picture is displayed, on the screen of the electronic device, in the three-dimensional mathematical model indicated by the preset set of equations, the electronic device may obtain a movement instruction, and move the at least one picture in the three-dimensional mathematical model indicated by the preset set of equations, according to the obtained movement instruction. The movement instruction includes a movement direction, a move speed and an attenuation period of time.

In an embodiment of the present disclosure, the electronic device obtains the movement instruction by a sliding, of the user's finger, on the screen of the electronic device, herein the movement direction may be the direction in which the user's finger is sliding on the screen of the electronic device. The movement speed may be the speed at which the user's finger is sliding on the screen of the electronic device, when the finger is being moved on the screen of the electronic device. The attenuation period of time may be determined from the speed at which the user's finger is sliding on the screen of the electronic device, and the attenuation period of time will be longer when the user's finger is sliding at a higher speed, and the attenuation period of time will be shorter when the user's finger is sliding at a lower speed.

In the method for displaying a picture according to the embodiment of the present disclosure, at least one picture sequence number is obtained and substituted into a preset set of equations, to calculate location information of at least one picture, and then the at least one picture is displayed on a screen of an electronic device, according to the location information of the at least one picture. Thus the picture being browsed by a user through software of the electronic device may be displayed three-dimensionally on the screen of the electronic device, based upon a three-dimensional mathematical model indicated by a preset set of equations, to thereby address the problems of a long modeling period of time and inefficient modeling, when the picture is three-dimensionally displayed.

Figure 2:
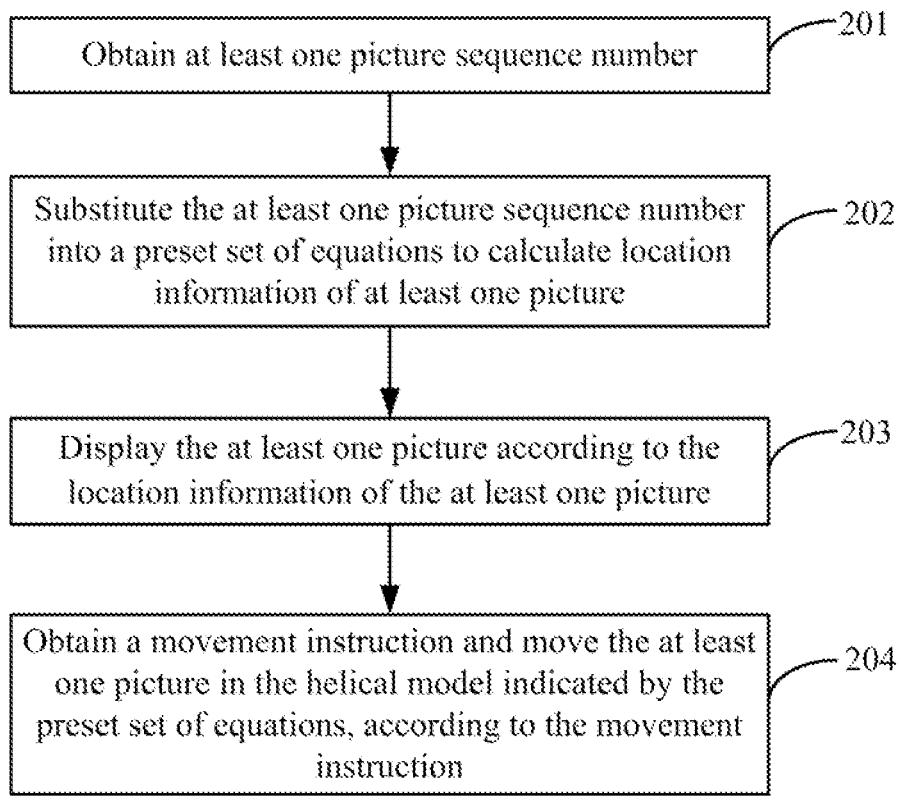
FIG. 2 illustrates a flow chart of a method for displaying a picture according to another embodiment of the present disclosure.

Another embodiment of the present disclosure provides a method for displaying a picture, based upon the embodiment corresponding to FIG. 1 above. Optionally a three-dimensional mathematical model indicated by a preset set of equations is a helical model. An embodiment will be described taking a helical model as an example, but the present disclosure will not be limited thereto. Referring to FIG. 2, the method includes the following operations.

S201 is to obtain at least one picture sequence number.

Among the at least one picture sequence number, a picture sequence number corresponds to a picture. Optionally, the picture corresponding to the at least one picture sequence number may be a picture to be displayed, by the electronic device, on a screen of the electronic device at some instance of time.

Optionally, the electronic device may be a handset, a tablet computer or another electronic device, but the present disclosure will not be limited thereto.

In an embodiment of the present disclosure, the sequence number of the picture to be displayed may be prearranged by the electronic device, or, the electronic device may alternatively rank and number the pictures, according to the picture names or the picture types, but the present disclosure will not be limited to any particular scheme in which the pictures to be displayed are numbered.

S202 is to substitute the at least one picture sequence number into a preset set of equations to calculate location information of at least one picture.

This embodiment will be described by taking the preset set of equations being a first set of equations as an example, the first set of equations including a first equation $x=r\cos(\theta \times i+t)$, a second equation $z=r\sin(\theta \times i+t)$ and a third equation $y=h\times i+h\times t/\theta$. The location information of the at least one picture includes the coordinate on the x axis, the coordinate on the y axis and the coordinate on the z axis in a virtual three-dimensional coordinate system.

Figure 3:
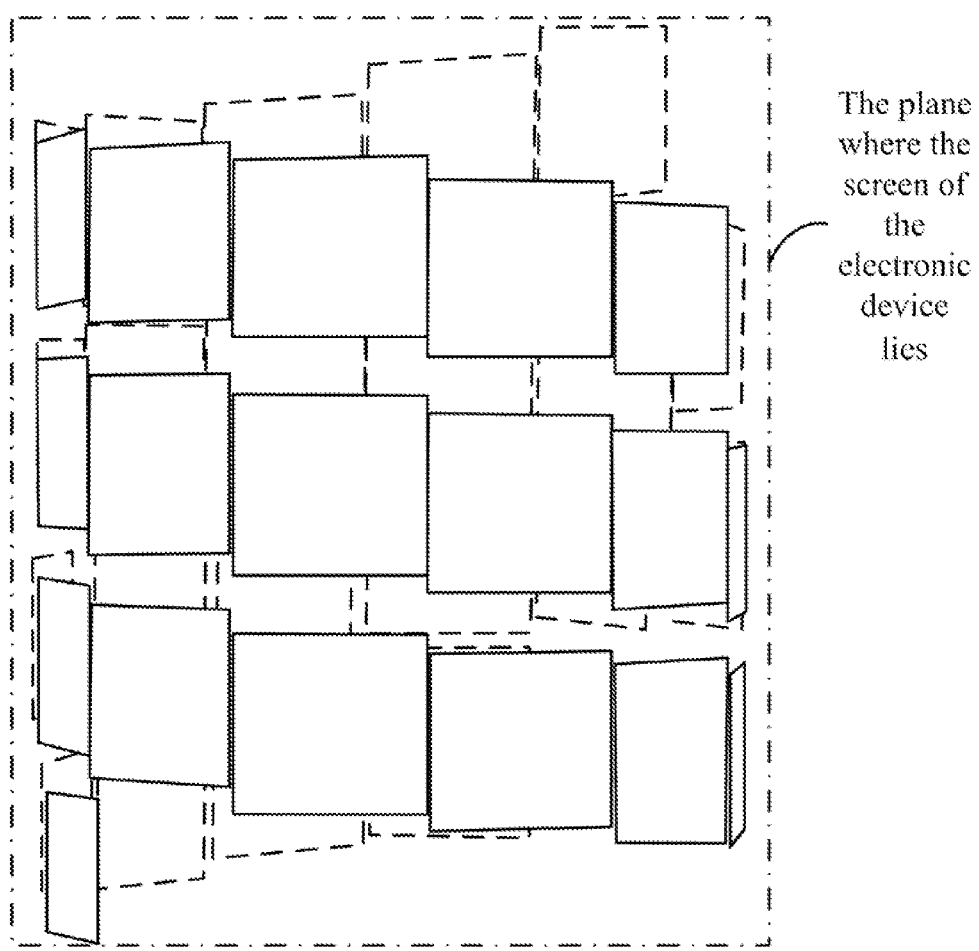
FIG. 3 illustrates a schematic diagram of a picture display effect according to an embodiment of the present disclosure.
Figure 4:
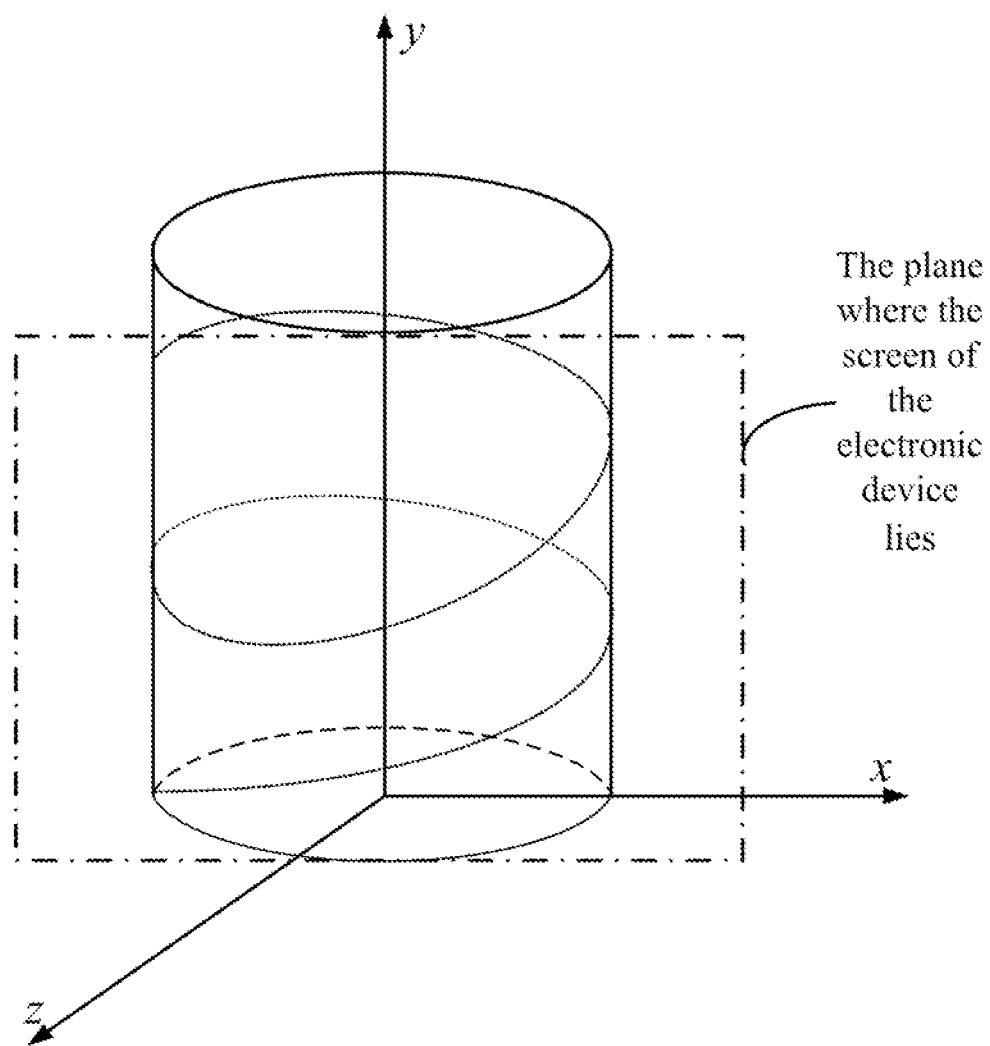
FIG. 4 illustrates a schematic diagram of a spiral model according to an embodiment of the present disclosure.

FIG. 3 illustrates the display effect of the picture corresponding to the first set of equations. The first set of equations corresponds to a mathematical model which is a cylinder model as illustrated in FIG. 4. A plane where the screen of the electronic device lies is in front of the cylinder and tangential to the side surface of the cylinder, and also the plane where the screen of the electronic device lies is perpendicular to the bottom of the cylinder; and in the pre-created virtual three-dimensional coordinate system, the origin of the virtual three-dimensional coordinate system is the center of the circle on the bottom surface of the cylinder, the x axis and the z axis lie in radial directions of the bottom surface of the cylinder respectively, and the y axis is the central axis of the cylinder. Optionally, x may represent the transverse location of the picture in the three-dimensional display effect, y may represent the height of the picture in the three-dimensional display effect, and z may represent the distance between a plane where the picture lies and the plane where the screen of the electronic device lies in the three-dimensional display effect; i represents the picture sequence number, i≥1, and i is an integer; r represents the radius of the cylinder; θ represents the central angle between projections, of two pictures adjacent in the x axis direction, onto the xoz plane in the virtual three-dimensional coordinate system; h represents the difference, in the y axis direction, between the two pictures adjacent in the x axis direction in the virtual three-dimensional coordinate system; and t represents the angle at which the picture is rotated, with the y axis being a rotation axis, in the three-dimensional display effect, and t is initially zero.

In an embodiment of the present disclosure, when the picture is three-dimensionally displayed in the cylinder model, the y axis of the coordinate system is the rotation axis, and if the picture is rotated toward the positive direction of the x axis, then the value of t is positive, and if the picture is rotated toward the negative direction of the x axis, then the value of t is negative.

Further, optionally the location information of the at least one picture further includes: the angle between the plane where the picture lies and the plane where the screen of the electronic device lies in the three-dimensional display effect, and as illustrated in FIG. 4, the cylinder is halved by the plane, where the screen of the electronic device lies, along the diameter of the cylinder of the three-dimensional mathematical model, and the set of equations corresponding to the helical model further includes a fourth equation α=θ×i+t, herein α represents the angle between the plane where the picture lies and the plane where the screen of the electronic device lies in the three-dimensional display effect, and θ represents the angle between two adjacent pictures in the three-dimensional display effect.

S203 is to display the at least one picture according to the location information of the at least one picture.

Optionally the location information of the picture includes coordinate values of the picture on the x axis, the y axis and the z axis in the pre-created virtual three-dimensional coordinate system, and the angle α between the plane where the picture lies and the plane where the screen of the electronic device lies in the three-dimensional display effect. Thus the display location and the display angle of the picture may be determined from the coordinate values of the picture on the x axis, the y axis and the z axis in the virtual three-dimensional coordinate system, and the angle α between the plane where the picture lies and the plane where the screen of the electronic device lies in the three-dimensional display effect.

In an embodiment of the present disclosure, the electronic device may display the respective pictures with a uniform size in a form of thumbnail.

In an embodiment of the present disclosure, the helical model may be applicable to an operating system of the electronic device and may be implemented through the following codes in the operating system of the electronic device:

```
private int renderItem(GLCanvas canvas, ItemEntry entry,
    float interpolate, int pass,boolean paperActive) {
    canvas.save(GLCanvas.SAVE_FLAG_ALPHA
GLCanvas.SAVE_FLAG_MATRIX);
    Position position = entry.target;
    if (mPositions != null) {
    position = mTempPosition;
    position.set(entry.target);
    position.x -= mScrollX;
    position.y -= mScrollY;
    Position source = mPositions.getPosition(entry.item.getIdentity( ),
        position);
    source.x += mScrollX;
    source.y += mScrollY;
    position = mTempPosition;
    Position.interpolate(source, entry.target, position, interpolate);
    }
    canvas.multiplyAlpha(position.alpha);
    if (paperActive) {
    canvas.multiplyMatrix(mPaper.getTransform(position,   entry.base,
mScrollX, mScrollY), 0);
    } else
    {
    canvas.translate(position.x,position.y,position.z);
    int slotIndex=entry.index;
    final float r=200;
    float y=slotIndex*25f;
    float alpha=theta*slotIndex;
    float x=(float)(r*Math.cos(alpha/180*Math.PI));
    float z=(float)(r*Math.sin(alpha/180*Math.PI));
    float beta=alpha%360;
    if(beta<=180)
    beta=90-beta;
    else
    beta=270-beta;
    canvas.multiplyMatrix(mPaper.getTransform(x-position.x,y-
position.y,z-position.z,beta),0);
    }
    canvas.rotate(position.theta,0,0,1);
    int more=entry.item.render(canvas,pass);
    canvas.restore( );
    return more;
    }
```

It can be seen that, this segment of codes firstly defines the coordinate values x, y and z of the at least one picture respectively on the x axis, the y axis and the z axis in the pre-created virtual three-dimensional coordinate system, and then assigns x, y and z respectively, that is, the segment of codes substitutes the obtained at least one picture sequence number into the helical model, to obtain the coordinate values of the at least one picture on the x axis, the y axis and the z axis.

In an embodiment of the present disclosure, in the virtual three-dimensional coordinate system, the at least one picture is displayed by rendering the at least one picture, on the z axis in a direction, which is from being away from the screen of the electronic device to being proximate to the screen of the electronic device. Thus a previously rendered picture may be avoided from being shielded by a subsequently rendered picture, which would otherwise degrade the three-dimensional display effect of the pictures.

S204 is to obtain a movement instruction, and to move the at least one picture in the helical model indicated by the preset set of equations, according to the movement instruction.

In an embodiment of the present disclosure, the electronic device obtains the movement instruction from the sliding of a user's finger on the screen of the electronic device, herein the movement instruction may include a movement direction, a move speed and an attenuation period of time, herein the movement direction may be the direction in which the user's finger is sliding on the screen of the electronic device The movement speed may be the speed at which the user's finger is sliding on the screen of the electronic device while the finger is being moved on the screen of the electronic device, and the attenuation period of time may be determined from the speed at which the user's finger is sliding on the screen of the electronic device, and the attenuation period of time will be longer when the user's finger is sliding at a higher speed, and the attenuation period of time will be shorter when the user's finger is sliding at a lower speed.

In an embodiment of the present disclosure, when the at least one picture is displayed, the movement of the picture may be sped up, by sliding the user's finger on the screen of the electronic device, for example, the picture may move up and down along the central axis of the helical model at a speed becoming lower gradually until the picture is still. Optionally, this may be implemented through the following codes in the operating system of the electronic device:

```
public boolean onFling(MotionEvent e1,MotionEvent e2, float velocityX, float velocityY)
{
cancelDown( );
int scrollLimit = mLayout.getScrollLimit( );
if (scrollLimit == 0) return false;
float velocity = WIDE ? velocityX : velocityY;
mScroller.fling((int) -velocity, 0, scrollLimit);
if (mUIListener != null) mUIListener.onUserInteractionBegin( );
invalidate( );
return true;
}
```

In an embodiment of the present disclosure, when the at least one picture is displayed, the pictures may be magnified into view, by clicking on the pictures on the screen of the electronic device. In an embodiment of the present disclosure, the electronic device may display the respective pictures with a uniform size in a form of thumbnail.

Optionally this may be implemented through the following codes in the operating system of the electronic device:

```
public boolean onTouch(MotionEvent e)
{
cancelDown( );
if (mDownInScrolling) return true;
int index = mLayout.getSlotIndexByPosition(e.getX( ), e.getY( ));
if (index != INDEX_NONE) mListener.onSingleTapUp(index);
return true;
}
```

In an embodiment of the present disclosure, the three-dimensional mathematical model indicated by the preset set of equations may alternatively be a model in another form, for example, the three-dimensional mathematical model indicated by the preset set of equations may alternatively be a temporal model, and when the three-dimensional mathematical model indicated by the preset set of equations is a temporal model, the preset set of equations includes a fifth equation, a sixth equation, a seventh equation, a seventh equation and the angle θ between the plane where the picture lies and the plane where the screen of the electronic device lies, herein the fifth equation is $x=n+(b-1)\times l$, the sixth equation is $y=[m+h\times(a-1)+d]\times\cos\theta$, the seventh equation is $z=[m+h\times(a-1)+d]\times\sin\theta$ and the eighth equation $i=u\times(a-1)+b$.

Optionally, after a picture sequence number i is obtained, all of the variables a, b and u are integers larger than or equal to 1, and b is smaller than or equal to a preset constant u, so a and b, both of which correspond to each picture sequence number i in a one-to-one manner, may be obtained through the eight equation $i=u\times(a-1)+b$.

Figure 5:
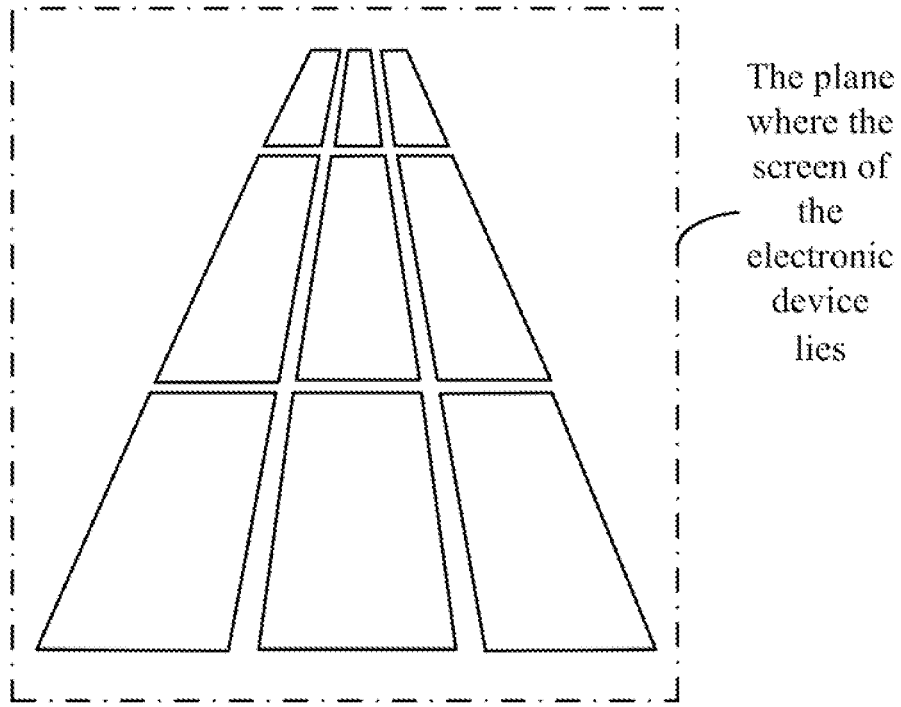
FIG. 5 illustrates a schematic diagram of a picture display effect according to an embodiment of the present disclosure.

Optionally as illustrated in FIG. 5, the picture may be three-dimensionally displayed in the temporal model. In the pre-created virtual three-dimensional coordinate system, the origin of the virtual three-dimensional coordinate system is the bottom-left vertex of the screen of the electronic device, the x axis extends in the width direction of the screen of the electronic device, the y axis extends in the length direction of the screen of the electronic device, and the z axis extends in the direction perpendicular to the screen of the electronic device. Optionally, x may represent the transverse location of the picture in the three-dimensional display effect, y may represent the height of the picture in the three-dimensional display effect, and z may represent the distance between the plane where the picture lies and the plane where the screen of the electronic device lies in the three-dimensional display effect; and i, a, u and b are integers larger than or equal to 1, herein i represents the picture sequence number, u represents the number of pictures displayed in a row in the three-dimensional display effect, and u represents a preset constant, a represents the sequence number of a row in which the picture is displayed in the three-dimensional display effect, b is smaller than or equal to u, and b represents the sequence number of a column in which the picture is three-dimensionally displayed, h represents the height of a picture in the three-dimensional display effect, l represents the width of a picture in the three-dimensional display effect, d represents the distance of the movement of the picture in the direction of the time axis in the three-dimensional display effect, and d is initially zero, m represents a first preset initial value and m>0, and n represents a second preset initial value and n>0; and optionally when the location information of the picture indicates coordinate values of the central point of the picture in the virtual three-dimensional coordinate system, m is half the height of the picture, and n is half the width of the picture; and when the location information of the picture indicates coordinate values of the bottom-left vertex of the picture in the virtual three-dimensional coordinate system, m is 0, and n is 0.

Optionally, when the picture is three-dimensionally displayed in the temporal model, the time axis represents the direction in which the picture is moved, and the time axis is arranged in the plane where the picture lies and perpendicular to the width of the picture; and if the picture is moved on the time axis away from the screen of the electronic device, then the value of d is positive, and if the picture is moved on the time axis toward the screen of the electronic device, then the value of d is negative, but this is merely exemplary here, and the present disclosure will not be limited thereto.

In the method for displaying a picture according to the embodiment of the present disclosure, at least one picture sequence number is obtained and substituted into a preset set of equations to calculate location information of at least one picture, and then the at least one picture is displayed on a screen of an electronic device, according to the location information of the at least one picture. Thus the picture being browsed by a user through software of the electronic device may be three-dimensionally displayed on the screen of the electronic device, based upon a three-dimensional mathematical model indicated by a preset set of equations, to thereby address the problems of a long modeling period of time and inefficient modeling when the picture is three-dimensionally displayed.

Figure 6:
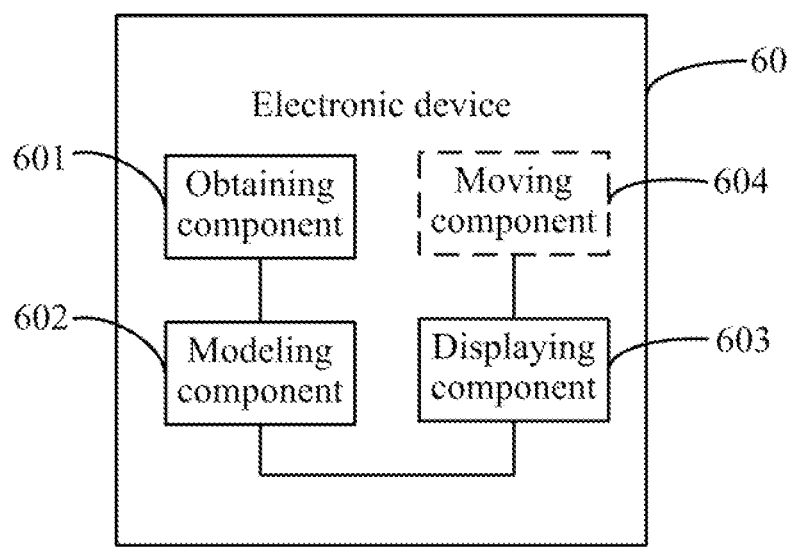
FIG. 6 illustrates a schematic structural diagram of an electronic device according to an embodiment of the present disclosure.

Another embodiment of the present disclosure provides an electronic device 60 as illustrated in FIG. 6, which includes a processor (not illustrated) including one or more processing cores, and a memory (not illustrated) in which program codes are stored, the program codes are capable of being executed by the processor to implement functions of an obtaining component 601, a modeling component 602 and a displaying component 603, which will be described below:

The obtaining component 601 is configured to obtain at least one picture sequence number.

The modeling component 602 is configured to substitute the at least one picture sequence number obtained by the obtaining component 601 into a preset set of equations, to calculate location information of at least one picture, herein the preset set of equations is a set of equations created in a virtual three-dimensional coordinate system, and location information of a picture corresponds to a picture sequence number.

The displaying component 603 is configured to display the at least one picture, according to the location information of the at least one picture obtained by the modeling component 602.

Optionally, the virtual three-dimensional coordinate system includes the x axis, the y axis and the z axis, and the location information of the at least one picture includes the coordinate of the at least one picture on the x axis, the coordinate thereof on the y axis, and the coordinate thereof on the z axis in the virtual three-dimensional coordinate system.

Optionally, the preset set of equations is a first set of equations including a first equation, a second equation and a third equation.

The first equation is $x = r \cos(\theta \times i + t)$, (the second equation is $z = r \sin(\theta \times i + t)$ and a third equation $y = h \times i + h \times t/\theta$.

The first set of equations corresponds to a model which is a cylinder model, and in the pre-created virtual three-dimensional coordinate system, the origin of the virtual three-dimensional coordinate system is the center of the circle on the bottom surface of the cylinder, the x axis and the z axis lie in radial directions of the bottom surface of the cylinder respectively, and the y axis is the central axis of the cylinder; i represents the picture sequence number, $i \geq 1$, and i is an integer; r represents the radius of the cylinder; $\theta$ represents the radius angle between projections of two pictures adjacent in the x axis direction onto the xoz plane in the virtual three-dimensional coordinate system; h represents the difference, in the y axis direction, between the two pictures adjacent in the x axis direction in the virtual three-dimensional coordinate system; and t represents the angle at which the picture is rotated, with the y axis being a rotation axis, in a three-dimensional display effect, and t is initially zero.

Optionally the first set of equations further includes a fourth equation $\alpha = \theta \times i + t$, herein $\alpha$ represents the angle between a plane where the picture lies and the plane where a screen of the electronic device lies in the three-dimensional display effect.

Furthermore the location information of the at least one picture further includes the angle between the plane where the picture lies and the plane where a screen of the electronic device lies in the three-dimensional display effect.

Optionally in the virtual three-dimensional coordinate system, the at least one picture is rendered on the z axis in a direction, which is from being away from the screen of the electronic device to being proximate to the screen of the electronic device.

Optionally, the preset set of equations is a second set of equations including a fifth equation, a sixth equation, a seventh equation and an eighth equation, and the angle $\theta$ between the plane where the picture lies and the plane where the screen of the electronic device lies.

The second set of equations corresponds to a model which is a temporal model; the fifth equation is $x = n + (b-1) \times l$, the sixth equation is $y = [m + h \times (a-1) + d] \times \cos \theta$, the seventh equation is $z = [m + h \times (a-1) + d] \times \sin \theta$, and the eighth equation is $i = u \times (a-1) + b$; the origin of the virtual three-dimensional coordinate system is the bottom-left vertex of the screen of the electronic device, the x axis extends in the width direction of the screen of the electronic device, the y axis extends in the length direction of the screen of the electronic device, and the z axis extends in the direction perpendicular to the screen of the electronic device; and i, a, u and b are integers larger than or equal to 1, i represents the picture sequence number, m represents a first preset initial value and $m > 0$, n represents a second preset initial value and $n > 0$, u represents the number of pictures displayed in a row in the three-dimensional display effect, and u represents a preset constant, a represents the sequence number of a row in which the picture is displayed in the three-dimensional display effect, b is smaller than or equal to u, and b represents the sequence number of a column in which the picture is three-dimensionally displayed, h represents the height of a picture in the three-dimensional display effect, l represents the width of a picture in the three-dimensional display effect, d represents the distance of the movement of the picture in the direction of the time axis in the three-dimensional display effect, and d is initially zero.

The location information of the at least one picture includes the coordinate of the at least one picture on the x axis, the coordinate thereof on the y axis, and the coordinate thereof on the z axis in the virtual three-dimensional coordinate system, and the angle $\theta$ between the plane where the picture lies and the plane where the screen of the electronic device lies.

Optionally, the obtaining component 601 is further configured to obtain a movement instruction including a movement direction, a movement speed and an attenuation period of time.

The electronic device 60 further includes a moving component 604 configured to move the at least one picture in a three-dimensional mathematical model indicated by the preset set of equations, according to the movement instruction.

In the electronic device for displaying a picture according to an embodiment of the present disclosure, at least one picture sequence number is obtained by the obtaining component, and after the at least one picture sequence number is obtained, the at least one picture sequence number obtained by the obtaining component is substituted into a preset set of equations, to calculate location information of at least one picture, and then the at least one picture is displayed by the displaying component on a screen of an electronic device. Thus while the picture being browsed by a user through software of the electronic device, the preset set of equations indicates a three-dimensional mathematical model, and optionally the three-dimensional mathematical model indicated by the preset set of equations may be a helical model or may be a temporal model, so the picture may be three-dimensionally displayed on the screen of the electronic device, to thereby address the problems of a long modeling period of time and inefficient modeling when the picture is three-dimensionally displayed.

In the several embodiments of the present disclosure, it shall be appreciated that the system, device and method as illustrated may be embodied otherwise, for example, the device described above is merely exemplary, for example, the device is divided into the units merely logically and functionally but may be divided otherwise in an actual implementation, for example, the units or the components may be combined or integrated into another system, or some of the features can be omitted or skipped.

The units described as separate components may or may not be physically separate, and the components illustrated as units may or may not be physical units, that is, they may be co-located or may be distributed on a plurality of network elements. A part or all of the units may be selected as needed in reality for the purpose of the solution according to the embodiment of the present disclosure.

Furthermore the respective functional units in the respective embodiments of the present disclosure may be integrated in a processing unit or the respective units may be separately physically included or two or more of the units may be integrated into a single unit. The units integrated above may be embodied in hardware or may be embodied in hardware and software functional units.

The integrated units embodied above in software functional units may be stored in a computer readable storage medium. The software functional units stored in the storage medium include several instructions to cause a computer device (which may be a personal PC, a server, a network device, etc.) to perform a part of the steps in the method according to the respective embodiments of the present disclosure, and the storage medium above includes a U disk, a mobile hard disk, a Read-Only Memory (ROM), a Random Access Memory (RAM), a diskette, an optical disk and various outer mediums in which program codes may be stored.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for displaying a picture to be presented by an electronic device with a display screen, the method comprising:
    obtaining, by the electronic device, a picture sequence number, the picture sequence number corresponding to a picture;
    substituting, by the electronic device, the picture sequence number into a preset set of equations to calculate location information in a three-dimensional display effect of the picture corresponding to the picture sequence number, wherein the preset set of equations is a set of equations created in a virtual three-dimensional coordinate system;
    displaying, by the electronic device, the picture according to the location information in the three-dimensional display effect of the picture;
    obtaining a movement instruction comprising a movement direction, a movement speed and an attenuation period of time; and
    moving the picture in a three-dimensional mathematical model indicated by the preset set of equations, according to the movement instruction.

2. The method according to claim 1, wherein:
    the virtual three-dimensional coordinate system comprises an x axis, a y axis and a z axis, and the location information of the picture comprises a coordinate of the picture on the x axis, a coordinate thereof on the y axis, and a coordinate thereof on the z axis in the virtual three-dimensional coordinate system.

3. The method according to claim 1, wherein:
    the preset set of equations is a first set of equations comprising a first equation, a second equation and a third equation, and
    the first equation is $x=r\cos(\theta \times i+t)$, the second equation is $z=r\sin(\theta \times i+t)$ and the third equation is $y=h \times i + h \times t/\theta$; and
    wherein the first set of equations corresponds to a model which is a cylinder model, and an origin of the virtual three-dimensional coordinate system is a center of a circle on a bottom surface of the cylinder, the x axis and the z axis lie in radial directions of the bottom surface of the cylinder respectively, and the y axis is a central axis of the cylinder; i represents the picture sequence number, $i \geq 1$, and i is an integer; r represents a radius of the cylinder; $\theta$ represents an central angle between projections, of two pictures adjacent in the x axis direction, onto an xoz plane in the virtual three-dimensional coordinate system; h represents a difference in the y axis direction, between the two pictures adjacent in the x axis direction in the virtual three-dimensional coordinate system; and t represents an angle at which the picture is rotated, with the y axis being a rotation axis, in a three-dimensional display effect, and t is initially zero.

4. The method according to claim 3, wherein:
    the first set of equations further comprises a fourth equation $\alpha=\theta \times i+t$, wherein $\alpha$ represents an angle between a plane where the picture lies and a plane where the screen of the electronic device lies in the three-dimensional display effect; and
    the location information of the picture further comprises the angle between the plane where the picture lies and the plane where a screen of the electronic device lies in the three-dimensional display effect.

5. The method according to claim 3, wherein after the location information of the picture is obtained, the method further comprises:
    rendering the picture on the z axis in a direction from being away from the screen of the electronic device to being proximate to the screen of the electronic device, in the virtual three-dimensional coordinate system.

6. The method according to claim 1, wherein:
    the preset set of equations is a second set of equations comprising a fifth equation, a sixth equation, a seventh equation and an eighth equation, and an angle $\theta$ between a plane where the picture lies and a plane where the screen of the electronic device lies,
    wherein the second set of equations corresponds to a temporal model; the fifth equation is $x=n+(b-1) \times l$, the sixth equation is $y=[m+h \times (a-1)+d] \times \cos\theta$, the seventh equation is $z=[m+h\times(a-1)+d]\times\sin\theta$, and the eighth equation is $i=u\times(a-1)+b$; an origin of the virtual three-dimensional coordinate system is a bottom-left vertex of the screen of the electronic device, the x axis extends in the width direction of the screen of the electronic device, the y axis extends in the length direction of the screen of the electronic device, and the z axis extends in the direction perpendicular to the screen of the electronic device; and i, a, u and b are integers larger than or equal to 1, wherein i represents the picture sequence number, m represents a first preset initial value and m>0, n represents a second preset initial value and n>0, u represents the number of pictures displayed in a row in the three-dimensional display effect, and u represents a preset constant, a represents the sequence number of a row in which the picture is displayed in the three-dimensional display effect, b is smaller than or equal to u, and b represents the sequence number of a column in which the picture is three-dimensionally displayed, h represents the height of a picture in the three-dimensional display effect, I represents the width of a picture in the three-dimensional display effect, and d represents a distance of a movement of the picture in a direction of the time axis in the three-dimensional display effect, and d is initially zero; and the location information of the picture comprises a coordinate of the picture on the x axis, a coordinate thereof on the y axis, and the coordinate thereof on the z axis in the virtual three-dimensional coordinate system, and the angle $\theta$ between the plane where the picture lies and the plane where the screen of the electronic device lies.

7. An electronic device, comprising:
one or more processors; and
a memory with program codes stored therein the program codes capable of being executed by the one or more processors to:
obtain a picture sequence number, the picture sequence number corresponding to a picture;
substitute the picture sequence number into a preset set of equations to calculate location information in a three-dimensional display effect of the picture, wherein the preset set of equations is a set of equations created in a virtual three-dimensional coordinate system;
display the picture according to the location information in the three-dimensional display effect of the picture;
obtain a movement instruction comprising a movement direction, a movement speed and an attenuation period of time; and
move the picture in a three-dimensional mathematical model indicated by the preset set of equations, according to the movement instruction.

8. The electronic device according to claim 7, wherein:
the virtual three-dimensional coordinate system comprises an x axis, a y axis and a z axis, and the location information of the picture comprises a coordinate of the at least one picture on the x axis, a coordinate thereof on the y axis, and a coordinate thereof on the z axis in the virtual three-dimensional coordinate system.

9. The electronic device according to claim 7, wherein:
the preset set of equations is a first set of equations comprising a first equation, a second equation and a third equation, and
the first equation is $x=r\cos(\theta\times i+t)$, the second equation is $z=r\sin(\theta\times i+t)$ and the third equation is $y=h\times i+t/\theta$; and wherein the first set of equations corresponds to a model which is a cylinder model, and in the pre-created virtual three-dimensional coordinate system, an origin of the virtual three-dimensional coordinate system is a center of a circle on a bottom surface of the cylinder, the x axis and the z axis lie in radial directions of the bottom surface of the cylinder respectively, and the y axis is a central axis of the cylinder; i represents the picture sequence number, $i\geq 1$, and i is an integer; r represents a radius of the cylinder; $\theta$ represents an central angle between projections of two pictures adjacent in the x axis direction onto an xoz plane in the virtual three-dimensional coordinate system; h represents a difference in the y axis direction, between the two pictures adjacent in the x axis direction in the virtual three-dimensional coordinate system; and t represents an angle at which the picture is rotated, with the y axis being a rotation axis, in a three-dimensional display effect, and t is initially zero.

10. The electronic device according to claim 9, wherein:
the first set of equations further comprises a fourth equation $\alpha=\theta\times i=t$, wherein $\alpha$ represents an angle between a plane where the picture lies and a plane where the screen of the electronic device lies in the three-dimensional display effect; and
the location information of the picture further comprises the angle between the plane where the picture lies and the plane where a screen of the electronic device lies in the three-dimensional display effect.

11. The electronic device according to claim 9, wherein:
the picture is rendered on the z axis in a direction from being away from the screen of the electronic device to being proximate to the screen of the electronic device, in the virtual three-dimensional coordinate system.

12. The electronic device according to claim 7, wherein:
the preset set of equations is a second set of equations comprising a fifth equation, a sixth equation, a seventh equation and an eighth equation, and an angle $\theta$ between a plane where the picture lies and a plane where the screen of the electronic device lies,
wherein the second set of equations corresponds to a temporal model; the fifth equation is $x=n+(b-1)\times l$, the sixth equation is $y=[m+h\times(a-1)+d]\times\cos\theta$, the seventh equation is $z=[m+h\times(a-1)+d]\times\sin\theta$, and the eighth equation is $i=u\times(a-1)+b$; an origin of the virtual three-dimensional coordinate system is a bottom-left vertex of the screen of the electronic device, the x axis extends in the width direction of the screen of the electronic device, the y axis extends in the length direction of the screen of the electronic device, and the z axis extends in the direction perpendicular to the screen of the electronic device; and i, a, u and b are integers larger than or equal to 1, wherein i represents the picture sequence number, m represents a first preset initial value and m>0, n represents a second preset initial value and n>0, u represents the number of pictures displayed in a row in the three-dimensional display effect, and u represents a preset constant, a represents the sequence number of a row in which the picture is displayed in the three-dimensional display effect, b is smaller than or equal to u, and b represents the sequence number of a column in which the picture is three-dimensionally displayed, h represents the height of a picture in the three-dimensional display effect, I represents the width of a picture in the three-dimensional display effect, and d represents a distance of a movement of the picture in a direction of the time axis in the three-dimensional display effect, and d is initially zero; and the location information of the picture comprises a coordinate of the picture on the x axis, a coordinate thereof on the y axis, and the coordinate thereof on the z axis in the virtual three-dimensional coordinate system, and the angle $\theta$ between the plane where the picture lies and the plane where the screen of the electronic device lies.

13. An electronic device comprising:
one or more processors; and
a memory with program codes stored therein, the program codes capable of being executed by the one or more processors to:
obtain a picture sequence number, the picture sequence number corresponding to a picture;
determine location information in a three-dimensional display effect of the picture corresponding to the picture sequence number according to the picture sequence number;
display the picture according to the location information in the three-dimensional display effect of the picture;
obtain a movement instruction comprising a movement direction, a movement speed and an attenuation period of time; and
move the picture in a three-dimensional mathematical model indicated by the preset set of equations, according to the movement instruction.

14. The electronic device of claim 13, wherein determining location information in a three-dimensional display effect of the picture corresponding to the picture sequence number according to the picture sequence number comprises:
substituting the picture sequence number into a preset set of equations to calculate location information in the three-dimensional display effect of the picture corresponding to the picture sequence number, wherein the preset set of equations is a set of equations created in a virtual three-dimensional coordinate system; and
wherein the virtual three-dimensional coordinate system comprises an x axis, a y axis and a z axis, and the location information of the picture comprises a coordinate of the picture on the x axis, a coordinate thereof on the y axis, and a coordinate thereof on the z axis in the virtual three-dimensional coordinate system.

15. The electronic device of claim 14, wherein:
the preset set of equations is a first set of equations comprising a first equation, a second equation and a third equation, and
the first equation is $x=r\cos(\theta \times i+t)$, the second equation is $z=r\sin(\theta \times i+t)$ and the third equation is $y=h\times i+h\times t/\theta$; and
wherein the first set of equations corresponds to a model which is a cylinder model, and an origin of the virtual three-dimensional coordinate system is a center of a circle on a bottom surface of the cylinder, the x axis and the z axis lie in radial directions of the bottom surface of the cylinder respectively, and the y axis is a central axis of the cylinder; i represents the picture sequence number, i≥1, and i is an integer; r represents a radius of the cylinder; $\theta$ represents a central angle between projections of two pictures adjacent in the x axis direction onto an xoz plane in the virtual three-dimensional coordinate system; h represents a difference in the y axis direction between the two pictures adjacent in the x axis direction in the virtual three-dimensional coordinate system; and t represents an angle at which the picture is rotated, with the y axis being a rotation axis, in a three-dimensional display effect, and t is initially zero.

16. The electronic device of claim 15, wherein:
the first set of equations further comprises a fourth equation $\alpha=\theta \times i+t$, wherein $\alpha$ represents an angle between a plane where the picture lies and a plane where the screen of the electronic device lies in the three-dimensional display effect; and
the location information of the picture further comprises the angle between the plane where the picture lies and the plane where a screen of the electronic device lies in the three-dimensional display effect.

17. The electronic device of claim 15, wherein after the location information is obtained, the program codes are further capable of being executed by the one or more processors to:
render the picture on the z axis in a direction from being away from the screen of the electronic device to being proximate to the screen of the electronic device, in the virtual three-dimensional coordinate system.

18. The electronic device of claim 14, wherein:
the preset set of equations is a second set of equations comprising a fifth equation, a sixth equation, a seventh equation and an eighth equation, and an angle $\theta$ between a plane where the picture lies and a plane where the screen of the electronic device lies;
wherein the second set of equations corresponds to a temporal model; the fifth equation is $x=n+(b-1)\times l$, the sixth equation is $y=[m+h\times(a-1)+d]\times\cos\theta$, the seventh equation is $z=[m+h\times(a-1)+d]\times\sin\theta$, and the eighth equation is $i=\times(a-1)+b$; an origin of the virtual three-dimensional coordinate system is a bottom-left vertex of the screen of the electronic device, the x axis extends in the width direction of the screen of the electronic device, the y axis extends in the length direction of the screen of the electronic device, and the z axis extends in the direction perpendicular to the screen of the electronic device; and i, a, u and b are integers larger than or equal to 1, wherein i represents the picture sequence number, m represents a first preset initial value and m>0, n represents a second preset initial value and n>0, u represents the number of pictures displayed in a row in the three-dimensional display effect, and u represents a preset constant, a represents the sequence number of a row in which the picture is displayed in the three-dimensional display effect, b is smaller than or equal to u, and b represents the sequence number of a column in which the picture is three-dimensionally displayed, h represents the height of a picture in the three-dimensional display effect, I represents the width of a picture in the three-dimensional display effect, and d represents a distance of a movement of the picture in a direction of the time axis in the three-dimensional display effect, and d is initially zero; and
the location information of the picture comprises a coordinate of the picture on the x axis, a coordinate thereof on the y axis, and the coordinate thereof on the z axis in the virtual three-dimensional coordinate system, and the angle $\theta$ between the plane where the picture lies and the plane where the screen of the electronic device lies.

* * * * *